United States Patent
Park et al.

(10) Patent No.: US 12,447,659 B2
(45) Date of Patent: Oct. 21, 2025

(54) MOLD

(71) Applicant: SAMSUNG ELECTRONICS CO., LTD., Suwon-si (KR)

(72) Inventors: Changhwan Park, Suwon-si (KR); Jiyoon Kim, Suwon-si (KR); Chulwoo Kim, Suwon-si (KR); Gyoochul Lee, Suwon-si (KR); Hyeonseop Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 667 days.

(21) Appl. No.: 17/838,905

(22) Filed: Jun. 13, 2022

(65) Prior Publication Data
US 2022/0305711 A1    Sep. 29, 2022

Related U.S. Application Data

(63) Continuation of application No. PCT/KR2020/015955, filed on Nov. 13, 2020.

(30) Foreign Application Priority Data

Dec. 13, 2019 (KR) .................. 10-2019-0167277

(51) Int. Cl.
  *B29C 45/40* (2006.01)
  *B29C 45/17* (2006.01)
  *B29C 45/36* (2006.01)
(52) U.S. Cl.
  CPC ........ *B29C 45/401* (2013.01); *B29C 45/1775* (2013.01); *B29C 2045/363* (2013.01)
(58) Field of Classification Search
  None
  See application file for complete search history.

(56) References Cited

U.S. PATENT DOCUMENTS 4,403,810 A * 9/1983 Bieneck .............. B29C 45/2602
                                              425/DIG. 221
6,177,041 B1    1/2001 Bietzer
(Continued)

FOREIGN PATENT DOCUMENTS

CN    1333733 A    1/2002
CN    202607983 U    12/2012
(Continued)

OTHER PUBLICATIONS

International Search Report dated Mar. 16, 2021 issued in Application No. PCT/KR2020/015955.
(Continued)

*Primary Examiner* — Armand Melendez
(74) *Attorney, Agent, or Firm* — STAAS & HALSEY LLP

(57) ABSTRACT

A mold includes a core in which a molded product is formed, the core comprises a cored body and a sliding core on the core body, separable from the core body in a first direction with respect to the core body, and an ejector to press the sliding core in the first direction to separate the molded product formed in the core from the core. The ejector includes a driver positioned below the core and movable toward a lower surface of the core in the first direction or away from the lower surface of the core in a direction opposite to the first direction, and a rod movable in the first direction to press the sliding core to be separated from the driver or movable in the direction opposite to the first direction to couple the sliding core with the driver, and the rod is movable further in the first direction than the driver.

14 Claims, 12 Drawing Sheets

(56) References Cited

U.S. PATENT DOCUMENTS

| | | | | |
|---|---|---|---|---|
| 7,963,759 | B1* | 6/2011 | Morey | B29C 45/66 |
| | | | | 425/589 |
| 2014/0212610 | A1* | 7/2014 | Arai | B29C 44/0415 |
| | | | | 428/36.5 |
| 2019/0126526 | A1* | 5/2019 | Sorimoto | B29C 33/44 |

FOREIGN PATENT DOCUMENTS

| | | | |
|---|---|---|---|
| CN | 103781612 A | 5/2014 | |
| CN | 104029355 B | 6/2016 | |
| JP | 5-138692 A | 6/1993 | |
| JP | 2557653 | 12/1997 | |
| JP | 11-342524 A | 12/1999 | |
| JP | 2001-96586 A | 4/2001 | |
| KR | 20-1990-0005724 Y1 | 6/1990 | |
| KR | 1999-0029941 U | 7/1999 | |
| KR | 2000-0001351 U | 1/2000 | |
| KR | 10-0465703 B1 | 1/2005 | |
| KR | 10-0921807 B1 | 10/2009 | |
| KR | 10-2018-0136085 A | 12/2018 | |
| WO | WO-2018179027 A1 * | 10/2018 | B29C 33/44 |

OTHER PUBLICATIONS

Supplementary European Search Report dated Nov. 6, 2023 issued in EP 20 89 8438.
Office Action dated Jun. 14, 2024 issued in Chinese Application No. 202080086296.7.
Office Action dated Aug. 19, 2024 issued in European Application No. 20 898 438.5.
Office Action dated Feb. 17, 2025 issued in Chinese Application No. 202080086296.7.
Office Action dated Apr. 7, 2025 issued in Korean Application No. 10-2019-0167277.

* cited by examiner

MOLD

CROSS-REFERENCE TO RELATED APPLICATION

This application is a continuation application, under 35 U.S.C. § 111(a), of International Application No. PCT/KR2020/015955, filed on Nov. 13, 2020, which claims priority to Korean Patent Application No. 10-2019-0167277, filed on Dec. 13, 2019, in the Korean Intellectual Property Office, the disclosure of which is incorporated herein by reference.

BACKGROUND

1. Field

The present disclosure relates to a mold with an improved structure for reducing a weight.

2. Description of the Related Art

In general, molds include injection molds for injection-molding molded products and press molds for manufacturing products by using iron plates. Molds are divided into movable types and fixed types and manufactured in order to stably manufacture products.

The injection molds include general injection molds for producing plastic products, die-casting molds for producing products by melting metal, like plastics, etc.

An injection mold is an apparatus installed in injection-molding equipment to manufacture molded products by injecting a raw material molten by the injection-molding equipment into a cavity provided inside the injection mold and hardening the raw material.

To manufacture a large-size molded product, a large-size injection mold is required. However, as the weight of an injection mold increases, there may be difficulties in transferring and installing the injection mold due to the weight of the injection mold upon installing of the injection mold in injection-molding equipment.

SUMMARY

The present disclosure is directed to providing a mold with an improved structure for reducing a total weight of the mold by omitting a high weight configuration among configurations constructing the mold.

The present disclosure is directed to providing a mold with an improved structure for preventing a molded project having at least three sides from being broken during extraction.

A mold includes: a core in which a molded product is formed, the core including a core body, and a sliding core rested on the core body and separable from the core body in a first direction with respect to the core body; and an ejector to press the sliding core in the first direction to separate the molded product formed in the core from the core, wherein the ejector includes a driver positioned below the core and movable toward a lower surface of the core in the first direction or away from the lower surface of the core in a direction opposite to the first direction, and a rod movable in the first direction to press the sliding core to be separated from the driver or movable in the direction opposite to the first direction to couple the sliding core with the driver, and the rod is movable further in the first direction than the driver.

Also, the mold may further include a template to support the core, wherein the template may include an open space of which at least one area opens such that a main body is positioned inside the template, and the driver may be movable up to the lower surface of the core in the first direction inside the open space.

Also, the mold may further include a molding plate positioned between the core and the template, and to support the core, wherein the molding plate may include a moving hole through which the ejector is movable in the first direction.

Also, a front end of the moving hole is facing the lower surface of the core in the first direction, and a rear end of the moving hole is facing the open space in the first direction.

Also, the sliding core may include a first sliding core formed in an upper side in first direction of the core body and being elevated in the first direction in a first portion of the core body, and a second sliding core formed in a lower side in first direction of the core body and being elevated in the first direction in a second portion of the core body, the rod may include a first rod to be coupled with or to be separated from the driver and the first rod is movable to press the first sliding core in the first direction, and a second rod coupled with the driver and is movable to press the second sliding core in the first direction, the first rod may move further in the first direction than the driver, and the second rod may move in the first direction in which the driver moves.

Also, the ejector may further include a coupler to couple the driver and the first rod or release the coupling of the driver and the first rod.

Also, the coupler may be coupled with the first rod in a second direction that is orthogonal to the first direction, and separated from the first rod in an opposite direction of the second direction.

Also, the coupler may include one side coupled with the driver and the other side coupled with or released from the first rod.

Also, the ejector may further include an elastic member to connect the driver to one side of the coupler and to elastically support one side of the coupler.

Also, the coupler may be movable between a first location at which the coupler is coupled with the first rod and a second location at which the coupler is separated from the first rod in the second direction, and the ejector may further include a pressing member to press the coupler in the opposite direction of the second direction to move the coupler from the first location to the second location.

Also, the coupler may include an insertion hole through which the pressing member is inserted in the opposite direction of the first direction, and the pressing member may protrude from the lower surface of the core body toward the opposite direction of the first direction.

Also, the pressing member may include a pressing portion to press the coupler in the opposite direction of the second direction when the pressing member is inserted into the insertion hole, and the pressing member may press the coupler while being inserted into the insertion hole when the coupler moves in the first direction together with the driver.

Also, the pressing portion may be inclined with respect to the first direction, and the coupler may further include an inclined portion positioned on an inner circumferential surface of the insertion hole, inclined with respect to the first direction, and in contact with the pressing portion to be pressed by the pressing portion when the pressing member is inserted into the insertion hole.

Also, a spacing may be formed between the first ejector and the first rod in the first direction.

Also, the ejector presses the second sliding core to move the second sliding core by a first distance in the first direction in a first stage, the ejector presses the first sliding core and the second sliding core to further move the first sliding core and the second sliding core together by a second distance in the first direction in a second stage, and the ejector presses the first sliding core to further move the first sliding core by a third distance in the first direction in a third stage.

A mold includes a core including a core body, and a sliding core rested on the core body and elevated in a first direction with respect to the core body; and an ejector to press the sliding core in the first direction to separate a molded product molded in the core from the core, wherein the ejector includes a driver positioned below the core in the first direction and to move up to a lower surface of the core in the first direction, a rod coupled with the driver and to move in the first direction to press the sliding core in the first direction, and a coupler including one side coupled with the driver and the other side coupled with or released from the rod such that the rod is detachably coupled with the driver.

The sliding core includes a first sliding core elevated in the first direction in a first portion formed in an upper side in first direction of the core body, and a second sliding core being elevated in the first direction in a second portion formed in a lower side in first direction of the core body, the rod may include a first rod detachably coupled with the driver and pressing the first sliding core in the first direction, and a second rod coupled with the driver and pressing the second sliding core in the first direction, the first rod may further move in the first direction than the driver, and the second rod may move in the first direction in which the driver moves.

The ejector presses the second sliding core to move the second sliding core by a first distance in the first direction in a first stage, the ejector presses the first sliding core and the second sliding core to further move the first sliding core and the second sliding core together by a second distance in the first direction in a second stage, and the ejector presses the first sliding core to further move the first sliding core by a third distance in the first direction in a third stage.

The first rod is movable by a distance obtained by summing the first distance, the second distance, and the third distance, and the driver and the second rod are movable by a distance obtained by summing the first distance and the second distance.

A mold includes a core including a core body, and a sliding core rested on the core body and being elevated in a first direction with respect to the core body; an ejector moving the sliding core in the first direction; and a template supporting the core, wherein the sliding core includes a first sliding core being elevated in the first direction in a first portion of the core body, formed in an upper side in first direction of the core body, and a second sliding core being elevated in the first direction in a second portion of the core body, formed in a lower side in first direction of the core body, the ejector includes a driver positioned inside the template and being elevated in the first direction, a first rod pressing the first sliding core in the first direction, a second rod pressing the second sliding core in the first direction, and a coupler coupled with or separated from the first rod in a second direction that is orthogonal to the first direction to detachably couple the driver with the first rod.

The present disclosure may maximally reduce a weight of a mold by omitting an eject plate constructing the mold and a space block for forming a space in which the eject plate performs a translation movement.

The present disclosure may prevent a molded product having at least three sides from being broken during an extraction operation for extracting the molded product by performing the extraction operation in stages.

DETAILED DESCRIPTION

Figure 1:
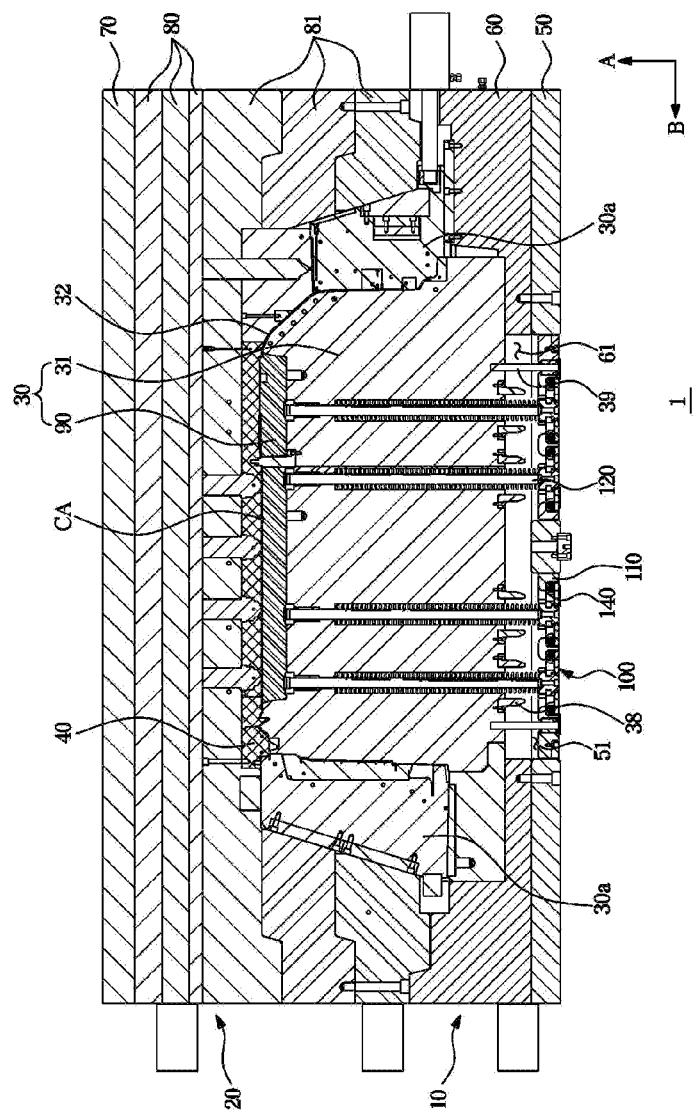
FIG. 1 is a schematic longitudinal sectional view of a mold according to the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe embodiments, and are not intended to restrict and/or limit the disclosure. It is to be understood that the singular forms "a," "an," and "the" include plural referents unless the context clearly dictates otherwise.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that, although the terms including ordinal numbers, such as "first", "second", etc., may be used herein to describe various components, these components should not be limited by these terms. These terms are only used to distinguish one component from another.

For example, a first component could be termed a second component, and, similarly, a second component could be termed a first component, without departing from the scope of the disclosure. As used herein, the term "and/or" includes any and all combinations of one or more of associated listed items.

Meanwhile, the terms "front direction", "rear direction", "upper portion", "lower portion", etc., when used in this specification, are defined based on the drawings, and the shapes and locations of the corresponding components are not limited by the terms.

Hereinafter, embodiments of the disclosure will be described in detail with reference to the accompanying drawings.

A mold 1 according to the disclosure may be installed in an injection device (not shown) to inject a molded product. In the disclosure, technical features of the mold 1 are disclosed, and descriptions about the injection device (not shown) and a process of injecting a molded product will be omitted.

Figure 2:
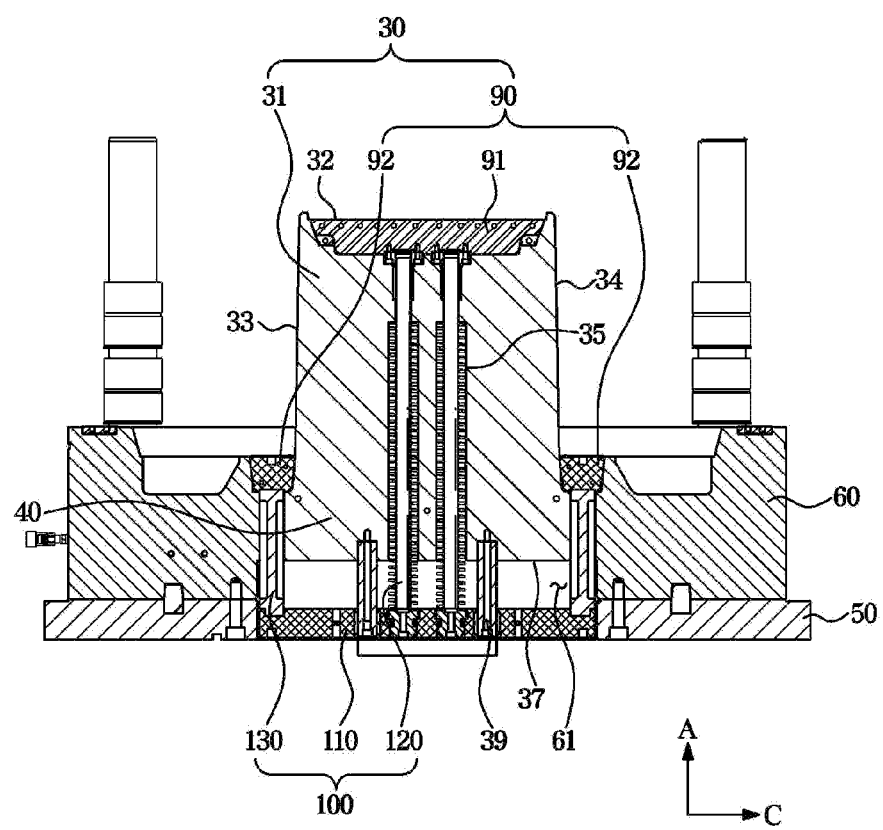
FIG. 2 is a schematic cross sectional view of a movable mold of a mold according to the disclosure.
Figure 3:
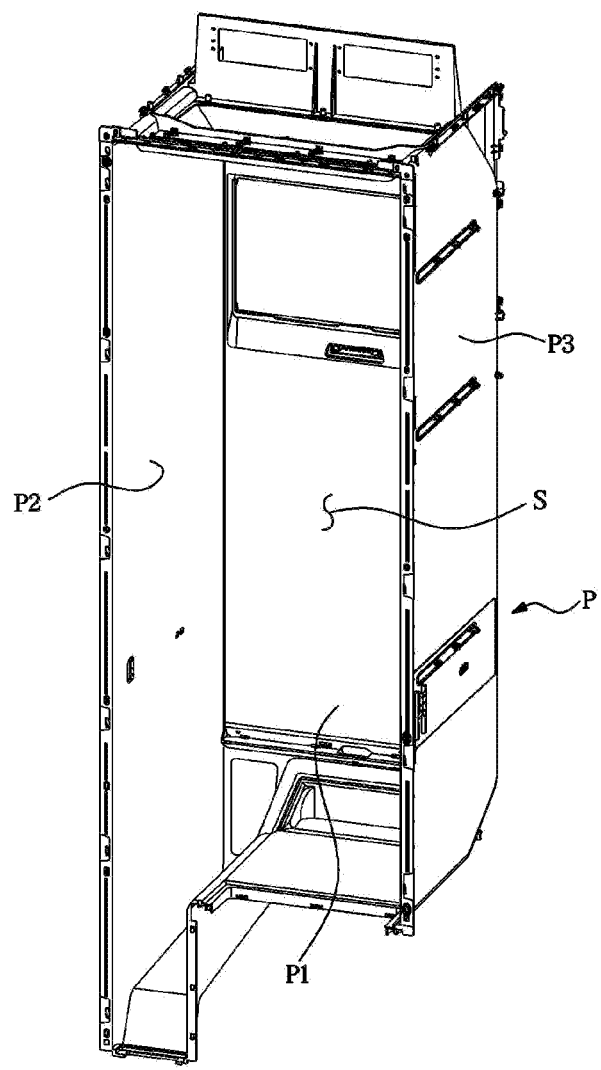
FIG. 3 is a perspective view of a molded product molded by a mold according to the disclosure.

FIG. 1 is a schematic longitudinal sectional view of a mold according to the disclosure. FIG. 2 is a schematic cross sectional view of a movable mold of a mold according to the disclosure. FIG. 3 is a perspective view of a molded product molded by a mold according to the disclosure.

As shown in FIGS. 1 to 3, the mold 1 according to the disclosure may include a first mold 10, and a second mold 20 detachably coupled with the first mold 10 and forming a cavity CA having a shape corresponding to a molded product P which will be manufactured, together with the first mold 10.

The second mold 20 may be positioned above the first mold 10 in a first direction A. Also, the second mold 20 may be fixed. The first direction A may correspond to an up-down direction, although not limited thereto. However, the first direction A may be set to a front-back direction or a left-right direction. Also, hereinafter, a direction toward the first direction A will be described as an up direction, and the opposite direction of the first direction A will be described as a down direction. However, the direction toward the first direction A may be described as a front direction, and the opposite direction of the first direction A may be described as a rear direction.

The first mold 10 may be coupled with or separated from the second mold 20 according to an up-down movement, although not limited thereto. However, the first mold 10 may be fixed and the second mold 20 may move up and down.

The mold 1 may include cores 30 and 40 configured to inject the molded product P. The cores 30 and 40 may include a first core 30 rested on the first mold 10, and a second core 40 rested on the second mold 20 and forming the cavity CA provided to correspond to a shape of the molded product P to be manufactured, together with the first core 30.

When the first core 30 moves upward and is coupled with the second core 40, the cavity CA may be formed, and when the first core 30 moves downward and is separated from the second core 40, the molded product P manufactured in the cavity CA may be taken out of the mold 1.

The molded product P may move downward together with the first mold 10 while being supported by the first core 30, and then, the molded product P may be separated from the second core 40 covering an upper portion of the molded product P and extracted to the outside, which will be described below.

Upon injection-molding, when a raw material is injected into the cavity CA, temperature of the cores 30 and 40 may be raised by high temperature of the injected raw material, and accordingly, a cooling process for reducing the raised temperature of the cores 30 and 40 may be required.

Accordingly, the mold 1 may receive a cooling fluid such as water through a cooling device (not shown) to cool the cores 30 and 40, and adjust a curing rate of the raw material injected into the cavity CA. Each of the first core 30 and the second core 40 may include a cooling flow path through which a cooling fluid supplied from the cooling device (not shown) passes, although not limited thereto. However, the cooling flow path (not shown) may be formed in any one of the first core 30 or the second core 40.

The first mold 10 according to the disclosure may include a first molding plate 60 for accommodating the first core 30, and a first template 50 on which the first molding plate 60 is installed.

The first template 50 may be connected to a transfer device (not shown) for moving the first molding plate 60 accommodating the first core 30.

The first core 30 may be supported by the first template 50 and be elevated in the first direction A. The first molding plate 60 may be formed by coupling a plurality of unit configurations with each other, although not limited thereto. However, the first molding plate 60 may be formed as a single configuration.

The second mold 20 may include a second template 70, and a second molding plate 80 by which the second core 40 is supported and which is fixed to the second template 70. The second template 70 may support both the second core 40 and the second molding plate 80. The second molding plate 80 may be formed by coupling a plurality of unit configurations with each other, although not limited thereto. However, the second molding plate 80 may be formed as a single configuration.

Also, the second mold 20 may include a third molding plate 81. The third molding plate 81 may support the second core 40 together with the second molding plate 80.

The third molding plate 81 may be formed by coupling a plurality of unit configurations with each other, although not limited thereto. However, the third molding plate 81 may be formed as a single configuration.

Hereinafter, only the first core 30 will be described, and, for convenience of description, the first core 30 is referred to as a core 30 and described. Also, hereinafter, only the first template 50 will be described, and, for convenience of description, the first template 50 is referred to as a template 50 and described. Also, hereinafter, only the first molding plate 60 will be described, and, for convenience of description, the first molding plate 60 is referred to as a molding plate 60 and described.

The core 30 may include an auxiliary core 30a for implementing a shape of the molded product P. The auxiliary core 30a may be formed as a configuration that is separated from the core 30, although not limited thereto. However, the auxiliary core 30a may be integrated into the core 30.

The core 30 may include a sliding core 90 for separating the molded product P hardened in the cavity CA from a core body 31. The sliding core 90 may reciprocate in the first direction A.

The sliding core 90 may form a portion of the core body 31. The sliding core 90 may be elevated in the first direction A with respect to the core body 31.

The sliding core 90 may be rested on the core body 31 when the molded product P is molded in the cavity CA. The sliding core 90 may move in the first direction A and press the molded product P in the first direction A to separate the molded product P being in close contact with the core body 31 from the core 30 after molding of the molded product P is completed.

The sliding core 90 may be used to separate the molded product P in a state in which the first mold 10 is separated from the second mold 20. The sliding core 90 may be in contact with the molded product P hardened and manufactured in the cavity CA and press the molded product P to separate the molded product P from the first mold 10.

The sliding core 90 according to an embodiment of the disclosure may include a first sliding core 91 and a second sliding core 92 that are positioned at different locations. Details about this will be described below.

The mold 1 may include an ejector 100 for moving the sliding core 90 in the first direction A or in the opposite direction of the first direction A.

The ejector 100 may include a driver 110 positioned below the core 30 (or referred to as behind the core 30) in the first direction A and moving up to a lower surface 37 (or referred to as a rear surface) of the core 30 (or the core body 31), and rods 120 and 130 coupled with the main body 110 in the first direction A to press the sliding core 90 in the first direction A.

The rods 120 and 130 may include a first rod 120 that presses the first sliding core 91 in the first direction A, and a second rod 130 that presses the second sliding core 92 in the first direction A. Details about this will be described below.

The first rod 120 may be detachably coupled with the driver 110. The ejector 100 may include a coupler 140 for selectively coupling/separating the first rod 120 with/from the driver 110. Details about this will be described below.

An inner case of a refrigerator, an inner case of a clothes care apparatus, etc. may be provided as a molded product formed by a mold. Generally, because an inner case of a large-size refrigerator or an inner case of a large-size clothes care apparatus has a large size, it is difficult to mold such an inner case as one body. Accordingly, such an inner case was manufactured by a method of injection-molding some pieces of an inner case and then assembling the pieces with each other.

In a case in which an inner case is formed with divided configurations, additional sealing between the configurations is required, and incomplete sealing may cause a problem that air or water leaks out of the inner case.

Also, a separate configuration for assembling the divided configurations together is required, which may cause a problem of deterioration of assembly.

To prevent the problem, a large size mold for molding a large volume molded product as one body is necessarily required.

Particularly, to mold a molded product having a large inner space, such as an inner case of a refrigerator or an inner case of a clothes care apparatus, a core having a large volume needs to be used to mold the inner space.

As a size of a mold increases, and particularly, a moving length of a rod pressing an ejector to extract a molded product from a large core increases, a length of the mold in an extraction direction increases, which further increases the size of the mold.

That is, to form an inner space S such as that of the molded product P molded by the mold 1 according to the disclosure as shown in FIG. 3, at least three portions P1, P2, and P3 extending in different directions may be needed.

To form the molded product P, the core 30 (or the core body 31) may include a first portion 32 extending in a second direction B that is substantially orthogonal to the first direction A, and a second portion 33 and a third portion 34 extending in the opposite direction of the first direction A from both ends of the first portion 32 in a third direction C that is orthogonal to the first direction A and the second direction B.

The first, second, and third portions 32, 33, and 34 of the core 30 may form a first portion P1, a second portion P2, and a third portion P3 of the molded product P, and the first, second, and third portions P1, P2, and P3 may form the inner space S.

As described above, after the molded product P is hardened, the sliding core 90 and the rods 120 and 130 may move in the first direction A to extract the molded product P from the core 30. Lengths by which the sliding core 90 and the rods 120 and 130 need to move in the first direction A may increase by the second portion 33 and the third portion 34 extending substantially in the first direction A to form the inner space S of the molded product P.

Generally, a mold includes a plurality of rods and an eject plate for moving the plurality of rods together by fixing the plurality of rods to extract a molded product from a core.

As the eject plate reciprocates in an extraction direction, the plurality of rods fixed to the eject plate may move to press the molded product P and extract the molded product from the core.

The eject plate may be positioned between a template and a molding plate, and reciprocate between the template and the molding plate. To form a space where the eject plate moves between the template and the molding plate such that the eject plate reciprocates in the extraction direction, a configuration of a space block may be additionally provided.

However, in a case in which the core 30 is formed at a high location in the extraction direction A, moving lengths of the rods 120 and 130 may increase. In a core of a typical mold, as a moving length of an eject plate increases, a length of a space block may also increase to correspond to the moving distance of the eject plate.

Accordingly, the entire size of the mold may increase. The increase in size of the mold causes a problem that the manufacturing cost of the mold increases. However, there is a greatest problem that an increase in weight of the mold makes installing the mold in injection-molding equipment difficult, resulting in deterioration of moldability of a molded product.

A mold may be installed in injection-molding equipment, a first mold or a second mold may move by the injection-molding equipment such that the first mold and the second mold are coupled with each other and separated from each other, and a molded product may be molded inside a cavity formed between the first mold and the second mold.

At this time, the mold may be transferred to the injection-molding equipment by a transfer device and installed in the injection-molding equipment. However, when a weight of the mold increases due to an increase in size of the mold, there may be difficulties in transferring the mold and installing the mold in the injection-molding equipment.

Accordingly, in the case of a mold formed to mold the molded product P including the at least three portions P1, P2, and P3 extending in different directions, it may be necessary to minimize the weight of the mold by minimizing the size of the mold.

To solve the problem, the mold 1 according to an embodiment of the disclosure may omit both a configuration of an eject plate supporting the rods 120 and 130 for moving the sliding core 90 and a configuration of a space block for securing a moving distance of a typical eject plate.

Instead of the eject plate, the mold 1 may include the driver 110 for moving the sliding core 90. By minimizing a moving distance in first direction of the driver 110 to minimize the entire size of the mold 1, more specifically, a size of the mold 1 extending in the first direction A, a total weight of the mold 1 may be reduced, and accordingly, the mold 1 capable of molding a large molded product P may be easily transferred and installed in the injection-molding equipment (not shown).

Typically, when a distance by which a rod needs to move to extract a molded product P is a minimum secure distance l1, the eject plate needs to move by the distance l1 between the molding plate and the template, and accordingly, a space block needs to be additionally provided between the molding plate and the template to secure the distance l1.

However, because the driver 110 of the ejector 100 of the mold 1 according to an embodiment of the disclosure moves by a distance l2 that is shorter than the minimum secure distance l1 by which the rod 120 needs to move in the first direction A, the mold 1 may have a shorter length in the first direction A than the typical mold, and accordingly, a total weight of the mold 1 may be reduced. A technical feature by which the driver 100 has a minimum secure distance that is shorter than the eject plate will be described with reference to FIGS. 7 to 9, below.

Hereinafter, the ejector 100 of the mold 1 according to an embodiment of the disclosure will be described in detail.

Figure 4:
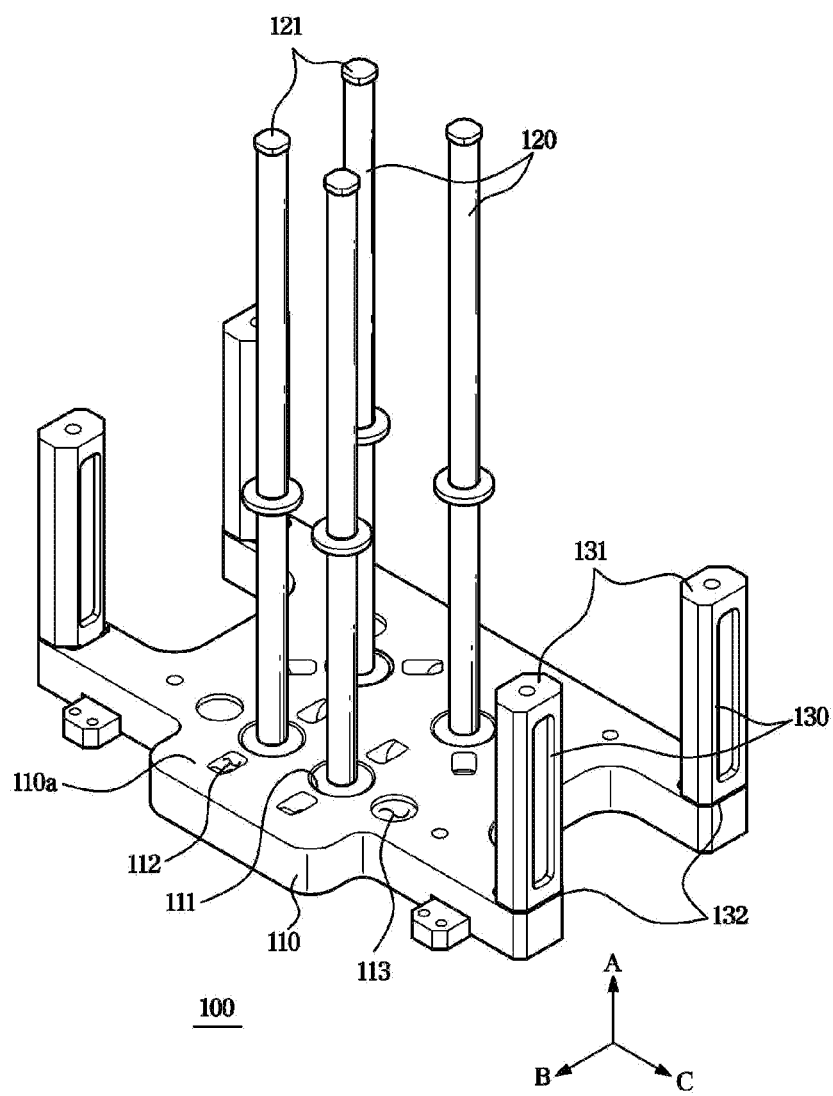
FIG. 4 is a perspective view of an ejector of a mold according to the disclosure.
Figure 5:
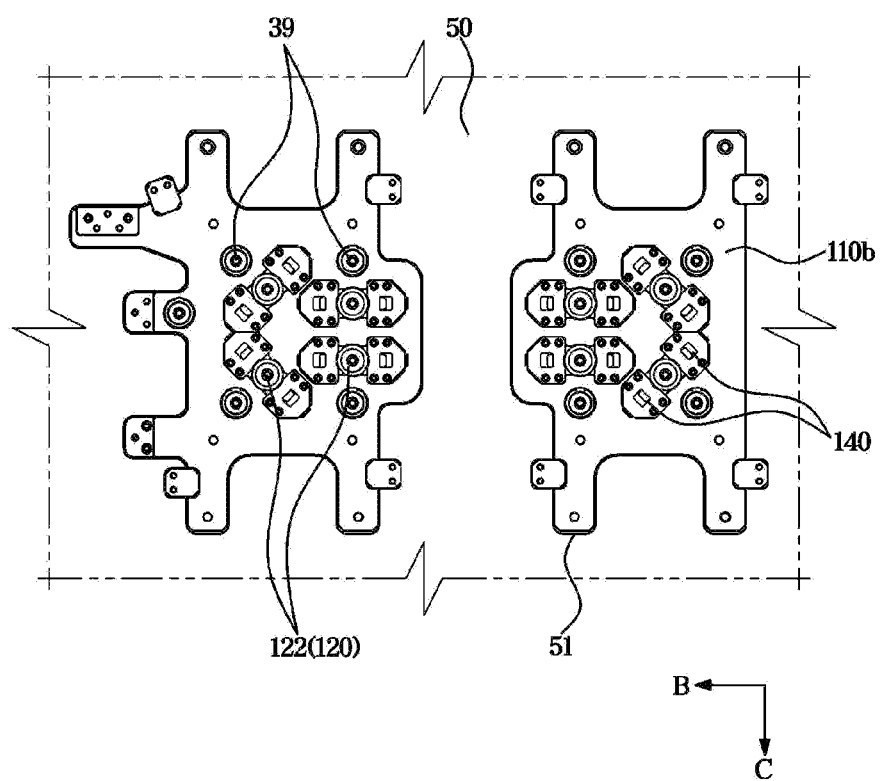
FIG. 5 is a bottom view showing a portion of a movable mold of a mold according to the disclosure.
Figure 6:
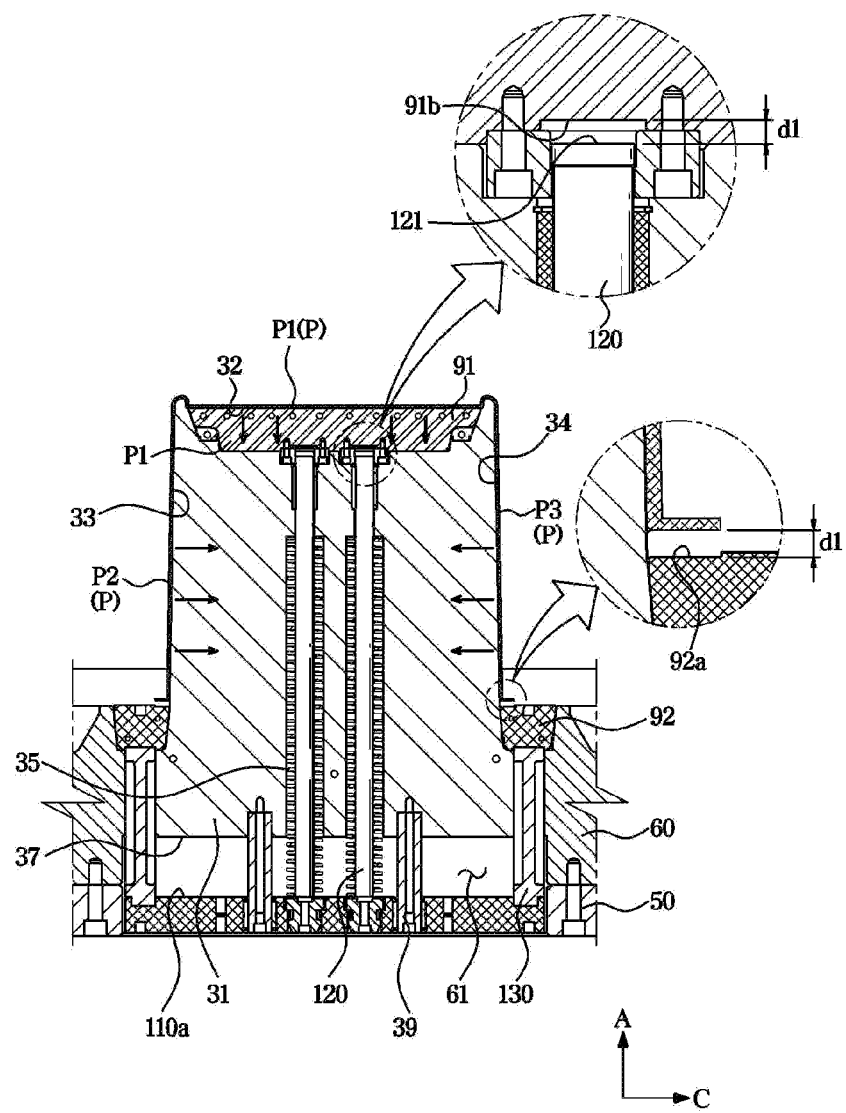
FIG. 6 is a schematic cross sectional view of a movable mold after a molding process, in a mold according to the disclosure.

FIG. 4 is a perspective view of an ejector of a mold according to the disclosure. FIG. 5 is a bottom view showing a portion of a movable mold of a mold according to the disclosure. FIG. 6 is a schematic cross sectional view of a movable mold after a molding process, in a mold according to the disclosure.

As shown in FIGS. 4 to 6, the ejector 100 may include the driver 110 positioned below the core 30 in the first direction A and moving up to a lower end of the core 30, and the rods 120 and 130 coupled with the driver 110 in the first direction A to press the sliding core 90 in the first direction A.

The rods 120 and 130 may include the first rod 120 that presses the first sliding core 91 in the first direction A, and the second rod 130 that presses the second sliding core 92 in the first direction A.

The first sliding core 91 may be positioned on an uppermost portion in first direction A of the core body 31 to press the first portion P1 of the molded product P molded on the first portion 32 of the core 30 in the first direction A.

The first sliding core 91 may form a portion of the first portion 32. That is, a portion of the core 30 or a portion of the core body 31 may be formed by the first sliding core 91. The first sliding core 91 may form a portion of an upper end of the core 30 in the first direction A.

A pair of second sliding cores 92 may be provided. The second sliding cores 92 may press the second portion P2 and the third portion P3 of the molded product P molded on the second portion 33 and the third portion 34 of the core 30 in the first direction A.

The pair of second sliding cores 92 according to an embodiment of the disclosure may be positioned at heights corresponding to each other in the first direction A. The reason may be because lower ends of the second portion P2 and the third portion P3 of the molded product P are formed at heights corresponding to each other with respect to the first direction A, although not limited thereto.

However, in a case in which the lower ends of the second portion P2 and the third portion P3 of the molded product P are formed at different heights in the first direction A, the second sliding cores 92 may be formed at different heights with respect to the first direction A.

Because the pair of second sliding cores 92 is driven in the same way, a second sliding core 92 among the pair of second sliding cores 92 will be described below.

The first rod 120 may press a lower end 91b of the first sliding core 91 to move the first sliding core 91 in the first direction A.

An upper end 121 of the first rod 120 may face the lower end 91b of the first sliding core 91. A lower portion of the first rod 120 may be coupled with the driver 110.

The first rod 120 may be coupled with the driver 110 in such a way to be separable from the driver 110. Details about this will be described below.

The first rod 120 may be inserted into a rod through hole 35 formed inside the core body 31. The upper end 121 of the first rod 120 may pass through the road through hole 35 and extend to the lower end 91b of the first sliding core 91.

The first rod 120 may move by a preset distance in the first direction A together with the driver 110 to press the first sliding core 91 in the first direction A.

The second rod 130 may press a lower end of the second sliding core 92 to move the second sliding core 92 in the first direction A.

An upper end 131 of the second rod 130 may be in contact with the lower end of the second sliding core 92. Accordingly, the second sliding core 92 may move by the same distance by which the second rod 130 moves.

A lower end 132 of the second rod 130 may be coupled with the driver 110. Unlike the first rod 120, the lower end 132 of the second rod 130 may be coupled with the driver 110 without being separated from the driver 110.

The second rod 130 may be inserted into a space formed between the core body 31 and the molding plate 60, although not limited thereto. However, the second rod 130 may be inserted into a road through hole formed inside the core body 31, like the first rod 120, or into a road through hole formed in the molding plate 60.

The second rod 130 may move by a preset distance in the first direction A together with the driver 110 to press the second sliding core 92 in the first direction A.

The driver 110, which is a member fixing the first and second rods 120 and 130, may function similarly to an eject plate of a typical mold.

The driver 110 may include a first hole 111 which the first rod 120 is inserted into and fixed to. The lower end of the first rod 120 may be inserted into the first hole 111 and fixed to the coupler 140 which will be described below to thereby be coupled with the driver 110.

The driver 110 may include a second hole 112 into which a pressing member 38 which will be described below is inserted. The second hole 112 may guide, when the driver 110 moves in the first direction A, the pressing member 38 positioned on the lower end of the core 30 to be inserted into the coupler 140.

The driver 110 may include a third hole 113 into which a guide rod 39 for guiding a movement of the driver 110 is inserted. The guide rod 39 may extend in the opposite direction of the first direction A from the lower surface 37 of the core body 31, and the driver 110 may reciprocate in the first direction A in a state in which the guide rod 39 is inserted in the third hole 113.

The template 50 may include an open space 51 of which at least one area opens such that the driver 110 is positioned inside the template 50. The driver 110 may be positioned inside the open space 51.

The driver 110 may move from the open space 51 to the lower surface 37 (the lower surface of the core body 31 in the first direction A) of the core body 31.

In the typical mold, the eject plate may be positioned between the molding plate and the template to increase a length in first direction A between the molding plate and the template. However, the driver 110 according to an embodiment of the disclosure may be positioned inside the template 50, and accordingly, there may be no length of the mold 1 additionally extending in the first direction A between the molding plate 60 and the template 50, which reduces the total weight of the mold 1.

The open space 51 may communicate with outside in the first direction A. Accordingly, the lower surface 110b of the driver 110 may be exposed to outside of the template 50 in the opposite direction of the first direction A.

Accordingly, a lower end 122 of the first rod 120 inserted in the first hole 111 may also be exposed to the outside of the template 50 in the opposite direction of the first direction A.

The molding plate 60 may include a moving hole 61 through which the ejector 100 moves in the first direction A inside the molding plate 60.

Inside the moving hole 61, the driver 110, the first rod 120, and the second rod 130 may move together in the first direction A. The moving hole 61 may extend in the first direction A by a minimum length by which the main body 110 needs to move in the first direction A.

The moving hole 61 may include a front end facing the lower surface 37 of the core body 31 and a rear end facing the open space 51, in the first direction A. The open space 51 and the moving hole 61 may be positioned at locations corresponding to each other in the first direction A.

Accordingly, the driver 110 positioned in the open space 51 may move from the open space 51 to the moving hole 61 in the first direction A, and move up to the lower surface 37 of the core body 31.

In the typical mold, the eject plate may be positioned between the molding plate and the template, and accordingly, a length in first direction between the molding plate and the template may increase. However, the driver 110 according to an embodiment of the disclosure may move in the moving hole 61 formed inside the molding plate 60. Accordingly, there may be no length of the mold 1 additionally extending in the first direction A between the molding plate 60 and the template 50, which reduces the total weight of the mold 1.

That is, because the driver 110 corresponding to the typical eject plate is movable in the first direction A inside the template 50 and the molding plate 60, a space block typically positioned between a template and a molding plate may be not needed. Accordingly, a length additionally extending in the first direction A by a space block may be reduced, which reduces the total weight of the mold 1.

The first rod 120 may further extend in the first direction A than the second rod 130. The reason may be because the second sliding core 92 is positioned at a lower height in the first direction A than the first sliding core 91.

The second sliding core 92 may press the lower ends of the second and third portions P2 and P3 of the molded product P. Because the lower ends of the second and third portions P2 and P3 are positioned at a lower location in the first direction A than the first portion P1 of the molded product P, the second sliding core 92 may be more adjacent to the driver 110 in the first direction A than the first sliding core 91.

During a process of injecting and hardening the molded product P, the molded product P may be partially contracted. At this time, the first portion P1 of the molded part P extending in the second direction B that is orthogonal to the first direction A as the extraction direction may be supported by the first sliding core 91 although the first portion P1 is contracted, whereas the lower ends of the second and third portions P2 and P3 extending substantially in the first direction A may be contracted in the first direction A and thus spaced a distance d1 from the second sliding core 92.

When the first and second rods 120 and 130 are raised together in the first direction A and thus press the first sliding core 91 and the second sliding core 92 together, the first sliding core 91 may press the first portion P1 of the molded product P whereas the second sliding core 92 may not press the second and third portions P2 and P3 of the molded product P, while the first and second rods 120 and 130 move by the distance d1 in the first direction A.

Accordingly, the entire of the molded product P may not be pressed in the first direction A, and only the first portion P1 may be pressed in the first direction A.

As described above, contraction stress may be generated between the molded product P and the core 30 by a contraction generated while the molded product P is hardened. The molded product P may be pressed toward the core 30 by the contraction stress, and the molded product P may be maintained in a state of being inserted into the core 30.

Although only the first portion P1 of the molded product P is pressed in the first direction A in a state in which the contraction stress is generated between the molded product P and the core 30, the second and third portions P2 and P3 of the molded product P may not move in the first direction A together with the first portion P1 due to the contraction stress formed between the second and third portions P2 and P3 of the molded product P and the second and third portions 33 and 34 of the core 30.

Accordingly, an external force pressing the molded product P in the first direction A may be generated in the first portion P1 of the molded product P, and an external force pressing the molded product P toward the core 30 may be generated in the second portions P2 and P3. Therefore, the molded product P may be partially broken by the external forces generated in different directions at connection portions between the first portion P1 and the second and third portions P2 and P3 of the molded product P.

At the connection portions between the first portion P1 and the second and third portions P2 and P3 of the molded product P, the molded product P may be cut, a shape of the molded product P may change, or molecular structures forming the molded product P may change.

That is, to mold the molded product P (see FIG. 3) having the inner space S as one body, as described above, although a technical feature for reducing the total weight of the mold 1 is an issue, a technical feature for extracting the molded product P from the core 30 without breaking the molded product P by applying a constant force to the individual portions P1, P2, and P3 because the molded product P includes the at least three portions P1, P2, and P3 extending in different directions to form the inner space S may also be an issue.

Hereinafter, a technical feature for safely extracting the molded product P from the core 30 by the ejector 100 will be described.

Figure 7:
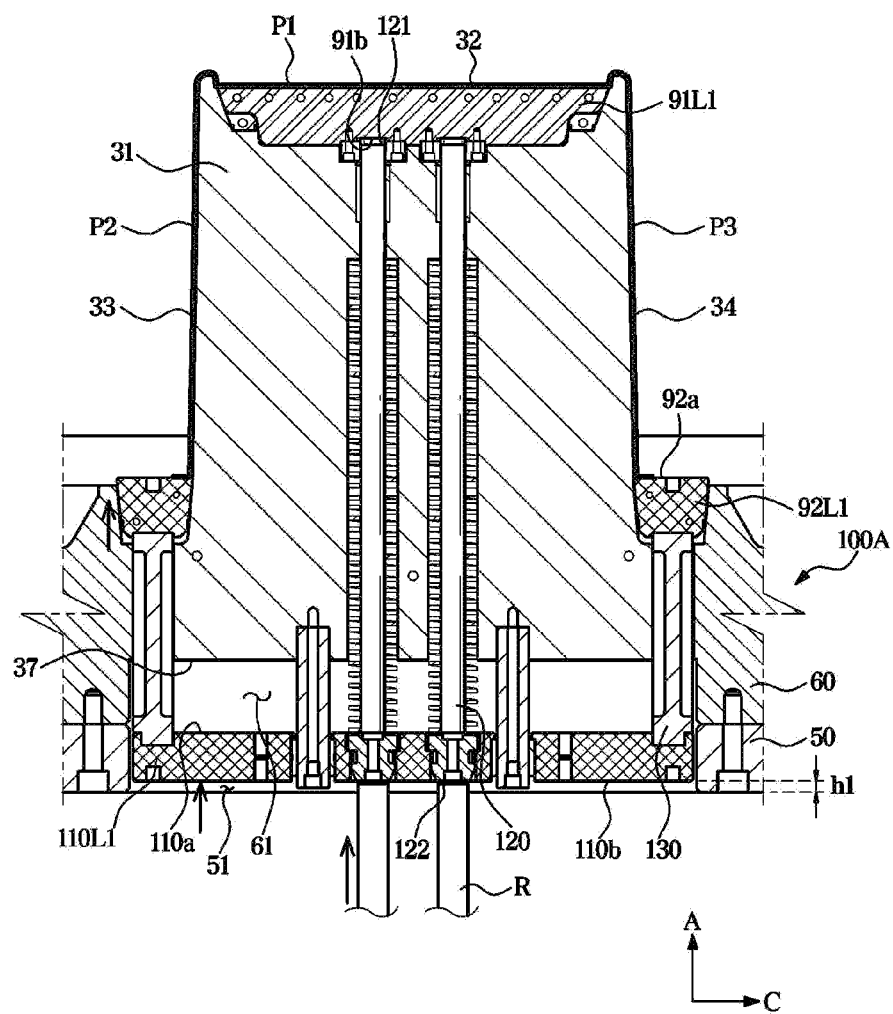
FIG. 7 is a cross sectional view showing a state of a first stage in an ejecting process of a molded product, in a mold according to the disclosure.
Figure 8:
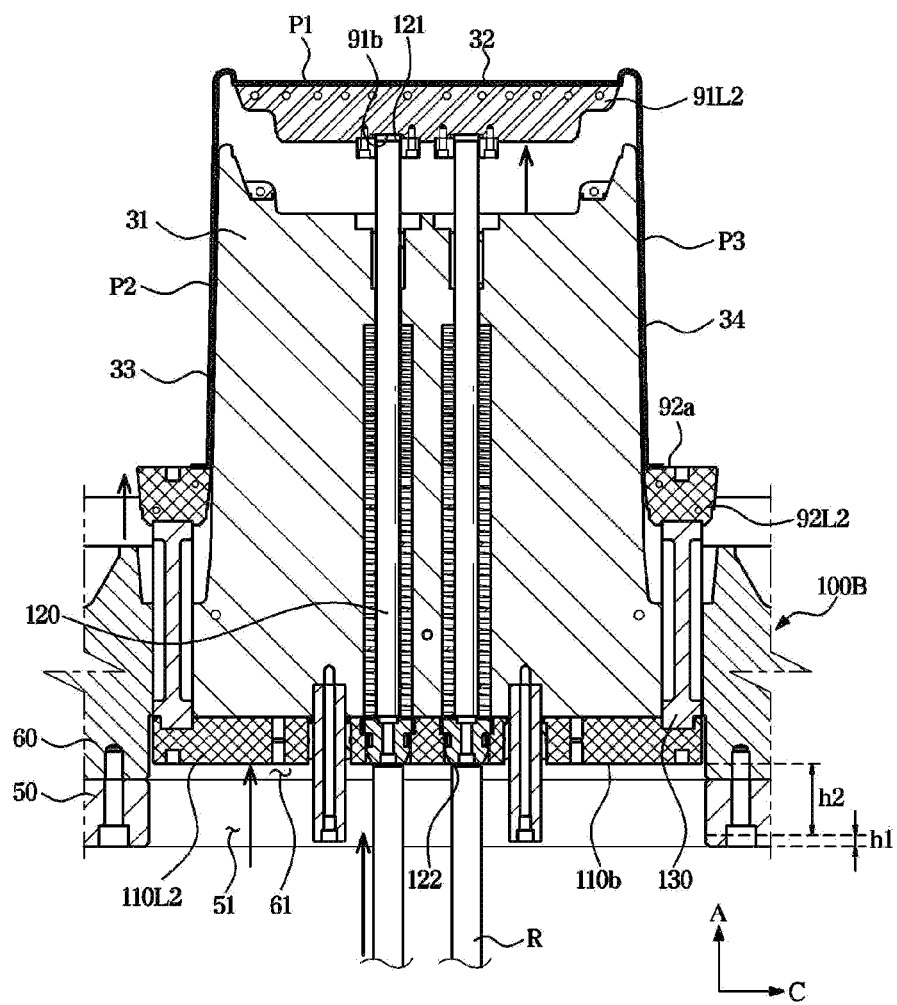
FIG. 8 is a cross sectional view showing a state of a second stage in an ejecting process of a molded product, in a mold according to the disclosure.
Figure 9:
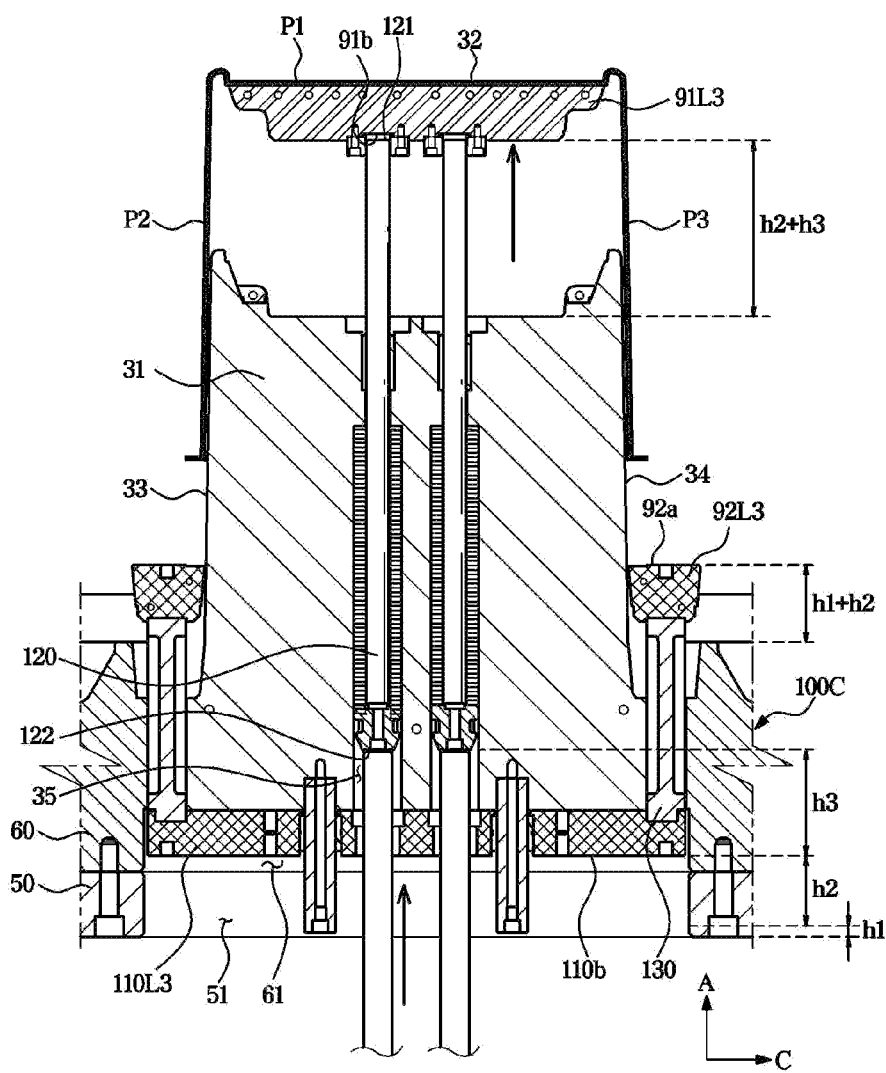
FIG. 9 is a cross sectional view showing a state of a third stage in an ejecting process of a molded product, in a mold according to the disclosure.

FIG. 6 is a schematic cross sectional view of a movable mold after a molding process, in a mold according to the disclosure, FIG. 7 is a cross sectional view showing a state of a first stage in an ejecting process of a molded product, in a mold according to the disclosure, FIG. 8 is a cross sectional view showing a state of a second stage in an ejecting process of a molded product, in a mold according to the disclosure, and FIG. 9 is a cross sectional view showing a state of a third stage in an ejecting process of a molded product, in a mold according to the disclosure.

As described above, when the molded product P is contracted, the upper end 92a of the second sliding core 92 may be spaced the distance d1 from the lower ends of the second and third portions P2 and P3 of the molded product P. Accordingly, when the ejector 100 moves in the first direction A to press the first and second sliding cores 91 and 92, the second sliding core 92 may move by the distance d1 in the first direction A without pressing the lower ends of the second and third portions P2 and P3 of the molded product P.

As such, to prevent the ejector 100 from pressing only the first sliding core 91 when the ejector 100 starts being raised in the first direction A inside the template 50, the lower end 91b of the first sliding core 91 may be spaced from the upper end 121 of the first rod 120 in the first direction A by the same distance d1 as that between the upper end 92a of the second sliding core 92 and the lower ends of the second and third portions P2 and P3 of the molded product P.

That is, before the mold 1 is extracted while the ejector 100 is not driven, the lower end 91b of the first sliding core 91 may be spaced the distance d1 from the upper end 121 of the first rod 120 in the first direction A without being in contact with the upper end 121 of the first rod 120.

Accordingly, as shown in FIG. 7, when the main body 110 starts moving in the first direction A and moves by a first height h1 corresponding to the distance d1, the driver 110, the first rod 120, the second rod 130, and the second sliding core 92 may move in the first direction A by the first height h1, while the first sliding core 91 may not move in the first direction A.

A location of the ejector 100 moved by the first height h1 in the first direction A is referred to as a first location 100A of the ejector 100. When the ejector 100 is at the first location 100A, the driver 110 may be positioned at a first location 110L1 moved by the first height h1 from a start location, and the second sliding core 92 may also be positioned at a first location 92L1 moved by the first height h1 from a start location. The first sliding core 91 may be positioned at a first location 91L1 without a height change in the first direction A from a start location.

The first and second rods 120 and 130 may move by the first height h1 in the first direction A from a start location, like the driver 110.

The ejector 100 may be pressed in the first direction A by a pressing rod R pressing the lower portion of the ejector 100 in the first direction A in the injection-molding equipment (not shown).

As described above, because the lower surface 110b of the driver 110 of the ejector 100 is exposed to the outside (see FIG. 5), the ejector 100 may be pressed from the outside of the mold 1.

The pressing rod R may press the lower end 122 of the first rod 120 in the first direction A. The pressing rod R may be positioned at a location corresponding to the first rod 120 in the first direction A.

A diameter of the pressing rod R may substantially correspond to a diameter of the first rod 120, and have a smaller diameter than the diameter of the first rod 120. Accordingly, the pressing rod R may penetrate the first hole 111 and the rod through hole 35 of the core body 31 from the rear surface 110b of the driver 110, which will be described below. The pressing rod R may press the rear end 122 of the first rod 120, and because the first rod 120 is coupled with the driver 110, the driver 110 may move in the first direction A together with the first rod 120 by the pressing rod R.

The second rod 130 coupled with the driver 110, as well as the first rod 120 and the driver 110, may also move to the same height at the same time in the first direction A together with the first rod 120 and the driver 110.

Thereafter, as shown in FIG. 8, the ejector 100 may further move in the first direction A from the first location 100A by continuous pressing by the pressing rod R, and move up to a second location 100B at which a movement of the driver 110 is limited.

When the ejector 100 moves higher than the first location 100A, the upper end 121 of the first rod 120 may be in contact with the lower end 91b of the first sliding core 91 and press the first sliding core 91.

That is, when the ejector 100 moves to the first height h1 or higher, the first sliding core 91 may also move in the first direction A together with the second sliding core 92.

When the ejector 100 reaches the first height h1 or higher, the molded product P may be pressed by the ejector 100 and move in the first direction A.

Before the ejector 100 reaches the first location 100A, the first sliding core 91 may not move and the second sliding core 92 may move to be in contact with the lower ends of the second and third portions P2 and P3 of the molded product P. Accordingly, the sliding core 90 may not press the molded product P in the first direction A.

Thereafter, when the ejector 100 moves to a higher location than the first location 100A in the first direction A, the first sliding core 91 and the second sliding core 92 may be pressed by the first rod 120 and the second rod 130 and press the molded product P together in the first direction A.

The first sliding core 91 and the second sliding core 92 may press the molded product P in the first direction A with a greater force than contraction stress formed between the molded product P and the core 30. Accordingly, the molded product P may move together with the sliding core 90 in the first direction A.

As the ejector 100 continues to move in the first direction A, an upper surface 110a of the driver 110 may be in contact with the lower surface 37 of the core body 31. After the driver 110 is in contact with the core 30, the driver 110 may no longer move in the first direction A. At this time, the ejector 100 may be positioned at the second location 100B.

The second rod 130 coupled with the driver 110 may also no longer move because a movement in first direction A of the driver 110 is limited.

When a height of the driver 110 moved until the driver 110 is in contact with the lower surface 37 of the core 30 and no longer moves after the driver 110 moves up to the first height h1 is a second height h2, all the first rod 120, the second rod 130, the first sliding core 91, and the second sliding core 92 may move by the second height h2 in the first direction A together with the driver 110.

When the ejector 100 is positioned at the second location 100B, the driver 110 may be positioned at a second location 110L2 at which the upper surface 110a of the driver 110 is in contact with the lower surface 37 of the core body 31, the first sliding core 91 may be positioned at a second location 91L2 by moving by the second height h2 because the first rod 120 moves in the first direction A together with the driver 110, and the second sliding core 92 may be positioned at a second location 92L2 by moving by the second height h2 because the second rod 130 moves in the first direction A together with the driver 110.

The second height h2 may be set to a minimum height to which the molded product P moves in the first direction A by the sliding core 90 to substantially cancel contraction stress between the molded product P and the core 30.

When the ejector 100 moves to a higher location than the second location 100B, only the first rod 120 may move in the first direction A, and accordingly, only the first portion P1 of the molded product P may be pressed by the first sliding core 91, which will be described below.

At this time, an external force applied in the first direction A may be transferred only to the first portion P1 of the molded product P, and to prevent the molded product P from being broken by the external force, the contraction stress between the molded product P and the core 30 may need to be cancelled.

Accordingly, a minimum height to which the molded product P moves to cancel the contraction stress between the molded product P and the core 30 may be the minimum height of the second height h2, and the minimum height may be set to the second height h2

However, to minimize a length of the mold 1 extending in the first direction A, the second height h2 may be preferably set to a minimum height to which the molded product P moves to cancel contraction stress between the molded product P and the core 30.

When the ejector 100 is positioned at the second location 100B, the coupler 140 may be separated from the first rod 120. Details about this will be described below.

Accordingly, as shown in FIG. 9, when the pressing rod R continues to press the ejector 100, a movement in first direction A of the driver 110 may be limited by the core 30, and only the first rod 120 separated from the driver 110 may move in the first direction A.

As described above, the pressing rod R may press the lower end 122 of the first rod 120, and because a diameter of the pressing rod R corresponds to a diameter of the first rod 120 or is smaller than the diameter of the first rod 120, the pressing rod R may penetrate the first hole 111 of the driver 110 and be inserted into the rod through hole 35 of the core body 31 to continue to press the first rod 120 in the first direction A.

The first rod 120 may further move by a third height h3 from the second height h2 such that the molded product P reaches a minimum height at which the molded product P is extractable from the core 30. That is, the third height h3 may be a length resulting from subtracting the second height h2 from the minimum height at which the molded product P is extractable from the core 30.

The third height h3 may be a length that is longer than a length resulting from subtracting the second height h2 from the minimum height at which the molded product P is extractable from the core 30.

The pressing rod R may stop pressing the first rod 120 when the first rod 120 further moves up to the third height h3 from the second height h2.

A location of the ejector 100 when the first rod 120 moves up to the third height h3 from the second height h2 is referred to as a third location 100C. When the ejector 100 is at the third location 100C, a third location 91L3 of the first sliding core 91 may be a location moved by the third height h3 in the first direction A from the second location 91L2.

In this case, a third location 92L3 of the second sliding core 92 may be the same as the second location 92L2. Also, a third location 110L3 of the driver 110 may be the same as the second location 110L2.

The second rod 130 may also be maintained at the same location as when the ejector 100 is at the second location 100B, like the driver 110. Accordingly, the third location 92L3 and the second location 92L2 of the second sliding core 92 may be maintained at the same locations.

A length of the third height h3 may be longer than that of the second height h1.

A total height by which the first sliding core 91 moves may be a height obtained by summing the second height h2 and the third height h3, and a total height by which the second sliding core 92, the main body 110, and the second rod 130 move may be a height obtained by summing the first height h1 and the second height h2.

Also, a total height by which the first rod 120 moves may be a height obtained by summing the first height h1, the second height h2, and the third height h3.

The ejector 100 may move up to the third location 100C from a start location in the first direction A, and a total height by which the first rod 120 moves may be higher than a total height by which the driver 110 and the second rod 130 move.

Because the first rod 120 is separable from the driver 110 and the first rod 120 is movable to a higher height than the driver 110, a total height by which the driver 110 moves may be smaller than a total height by which the first sliding core 91 moves to extract the molded product P.

Accordingly, a length in first direction A of the open space 51 of the template 50 and the moving hole 61 of the molding plate 61 formed to move the driver 110 in the first direction A may be smaller than a minimum height for extracting the molded product P.

In a typical case, because an eject plate needs to move by a minimum height for extracting a molded product, a total height of a mold has increased by the minimum height for extracting the molded product, which increases a weight of the mold.

However, according to an embodiment of the disclosure, although the driver 110 corresponding to the eject plate moves to a lower height than a height for extracting a molded product P, the driver 110 may press the molded product P to the height for extracting the molded product P.

Accordingly, a total height in first direction A of the mold 1 may become smaller, and accordingly, the weight of the mold 1 may be reduced. Therefore, it may be possible to easily transfer the mold 1 and install the mold 1 in injection-molding equipment (not shown).

The reason may be because the first rod 120 of the ejector 100 is separable from the driver 110.

The ejector 100 may move in the first direction A through three stages.

That is, the ejector 100 may move in the first direction A through a first stage in which the ejector 100 reaches the first location 100A, a second stage in which the ejector 100 further moves in the first direction A than in the first stage to reach the second location 100B, and a third stage in which the ejector 100 further moves in the first direction A than in the second stage to reach the third location 100C.

The first stage may be to cancel a spacing between the second and third portions P2 and P3 of the molded product P and the second sliding core 92 by moving only the second sliding core 92 in the first direction A.

The second stage may be to cancel contraction stress formed between the molded product P and the core 30 by causing both the first sliding core 91 and the second sliding core 92 to press the molded product P in the first direction A to press the molded product P in the first direction A safely from the contraction stress formed between the molded product P and the core 30.

The third stage may be a stage for moving only the first sliding core 91 in a state in which contraction stress formed between the molded product P and the core 30 is cancelled to press the molded product P to extract the molded product P from the core 30. The third stage may be to minimize a moving distance of the driver 110 by further moving only the first rod 120 in the first direction A.

As such, because the ejector 100 moves in the first direction A through three stages, the molded product P may be extracted safely without being broken, and a moving distance in first direction A of the driver 110 may be reduced, which reduces the size of the mold 1.

Hereinafter, a technical feature for coupling/separating the first rod 120 with/from the driver 110 will be described in detail.

Figure 10:
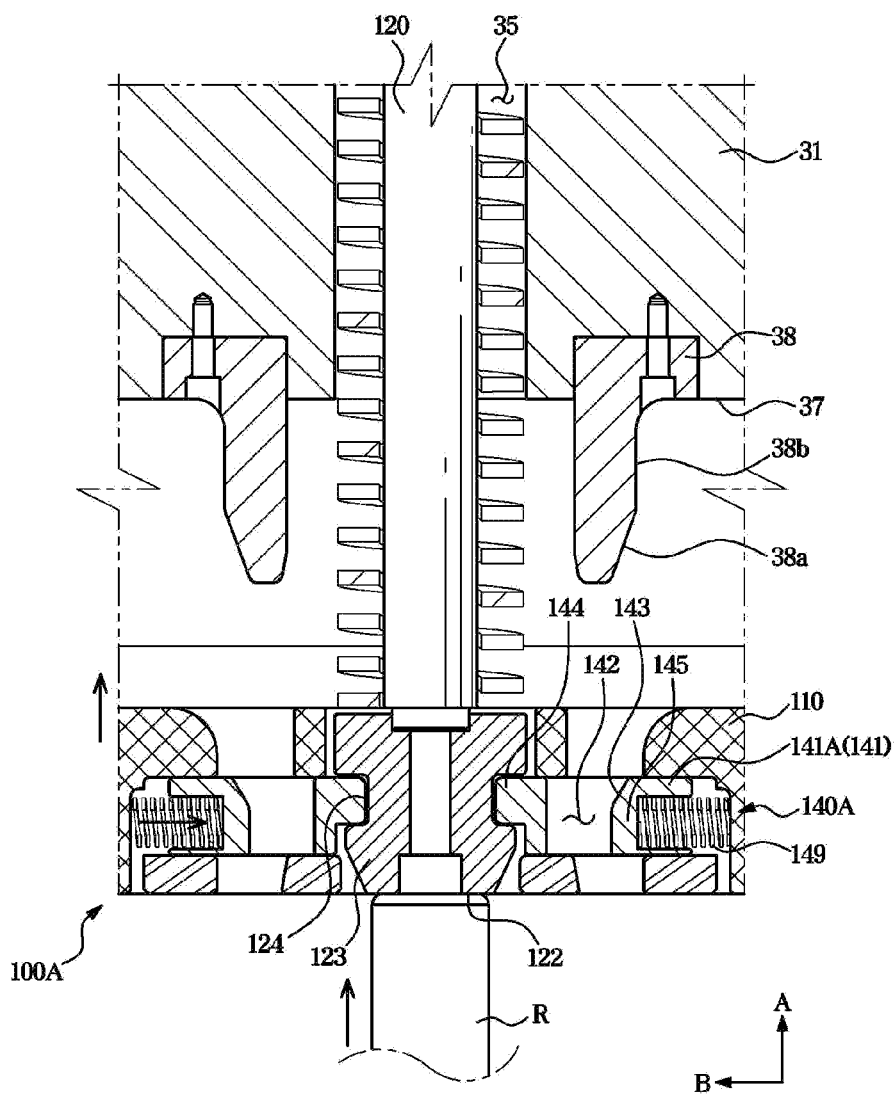
FIG. 10 is an enlarged view of a portion of FIG. 1.
Figure 11:
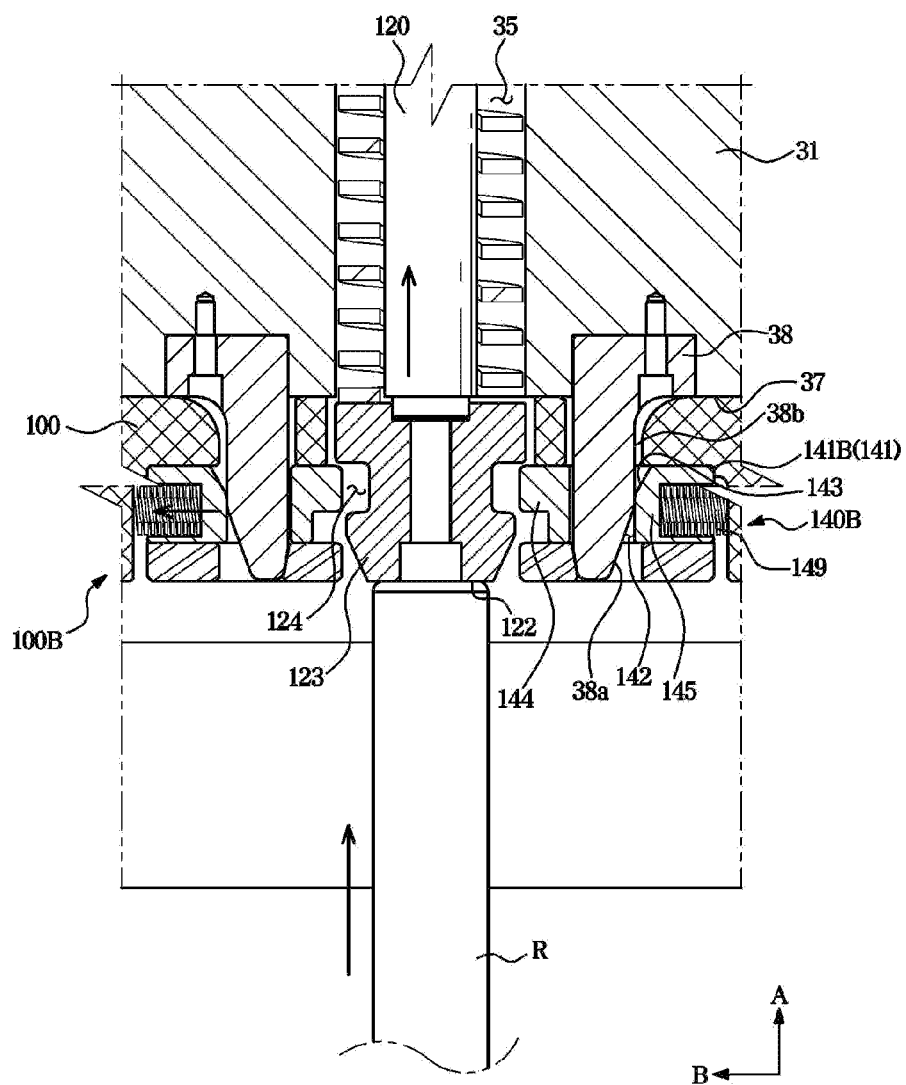
FIG. 11 is a longitudinal sectional view showing a state of a second stage in an ejecting process of a molded product, in a portion of a mold according to the disclosure.
Figure 12:
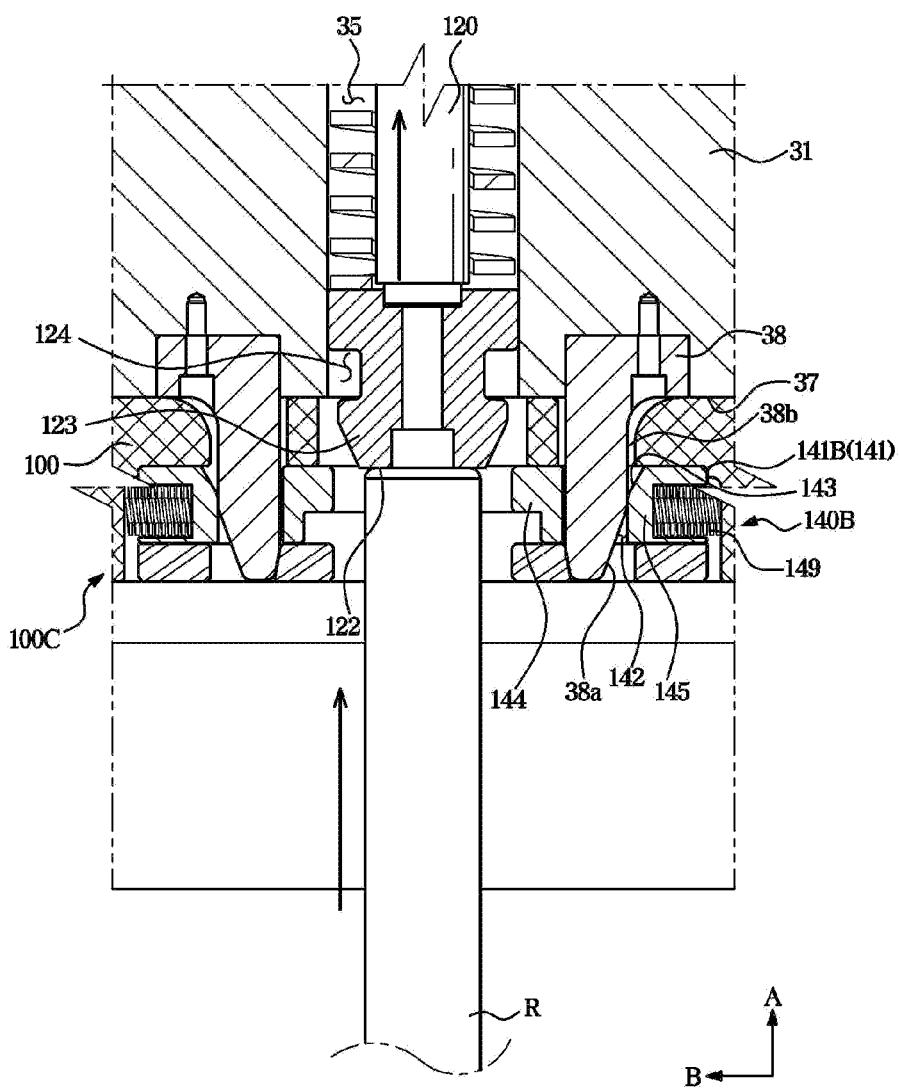
FIG. 12 is a longitudinal sectional view showing a state of a third stage in an ejecting process of a molded product, in a portion of a mold according to the disclosure.

FIG. 10 is an enlarged view of a portion of FIG. 1, FIG. 11 is a longitudinal sectional view showing a state of a second stage in an ejecting process of a molded product, in a portion of a mold according to the disclosure, and FIG. 12 is a longitudinal sectional view showing a state of a third stage in an ejecting process of a molded product, in a portion of a mold according to the disclosure.

The ejector 100 may include the coupler 140 for maintaining or releasing a coupled state of the driver 110 and the first rod 120.

The coupler 140 may be coupled with the first rod 120 before the ejector 100 moves to the second location 100B to couple the first rod 120 with the driver 110.

The coupler 140 may be coupled with the first rod 120 in the second direction B and separated from the first rod 120 in the opposite direction of the second direction B.

That is, the coupler 140 may move between a first location 140A at which the coupler 140 is coupled with the first rod 120 and a second location 140B at which the coupler 140 is separated from the first rod 120 in the second direction B.

When the coupler 140 moves in the first direction A, not in the second direction B, to be coupled/separated with/from the first rod 120, a thickness in first direction A of the driver 110 may increase to increase a total volume of the mold 1. Therefore, preferably, the coupler 140 may move in the second direction B or the third direction C that is orthogonal to the first direction A.

The coupler 140 may include a body 141, a first coupling portion 145 positioned at one side of the body 141 and coupled with the driver 110, and a second coupling portion 144 positioned at the opposite side of the first coupling portion 145 and coupled with the first rod 120.

The first rod 120 may include a lower end portion 123 forming the lower end 122 and positioned in the lower portion of the first rod 120. The lower end portion 123 may be provided as a separate configuration from the first rod 120 and coupled with the first rod 120. However, the lower end portion 123 may be integrated into the first rod 120.

The lower end portion 123 may include a coupling groove 124 in which the second coupling portion 144 is inserted to couple the first rod 120 with the coupler 140.

The coupling groove 124 may be in a shape of a groove formed in a diameter direction in an outer circumference surface of the lower end portion 123.

The coupler 140 may include an elastic member 149 for pressing the first coupling portion 145 in the second direction B. The elastic member 149 may press the body 141 in an extension direction of the first rod 120 to maintain a state in which the second coupling portion 144 is inserted in the coupling groove 124. The direction in which the elastic member 149 presses the body 141 to the first rod 120 is referred to as the second direction B. Accordingly, as shown in FIG. 10, the coupler 140 may be maintained in a state of being coupled with the first rod 120.

The first coupling portion 145 may be in contact with the main body 110 in the first direction A. The first coupling portion 145 may be in contact with the driver 110 to maintain a coupled state of the coupler 140 and the driver 110.

The ejector 100 may include the pressing member 38 for pressing the coupler 140 in the opposite direction of the second direction B such that the coupler 140 moves from the first location 140A at which the coupler 140 is coupled with the first rod 120 to the second location 140B at which the coupler 140 is separated from the first rod 120.

When the coupler 140 is at the first location 140A, the body 141 may be pressed in the second direction B and positioned at a first location 141A in which the second coupling portion 144 is inserted in the coupling groove 124.

The pressing member 38 may protrude in the opposite direction of the first direction A from the lower surface 37 of the core 30.

The coupler 140 may include an insertion hole 142 through which the pressing member 38 is inserted in the opposite direction of the first direction A. The insertion hole 142 may be positioned to correspond to the pressing member 38 in the first direction A. Accordingly, when the driver 110 moves in the first direction A, the insertion hole 142 may move in the first direction A. As the driver 110 is adjacent to the lower surface 37 of the core 30, the pressing member 38 may be inserted into the insertion hole 142.

The pressing member 38 may include a pressing portion 38a for pressing the body 141 in the opposite direction of the second direction B when the pressing member 38 is inserted into the insertion hole 142. The pressing portion 38a may be inclined with respect to the first direction A.

The coupler 140 may further include an inclined portion 143 positioned on an inner circumferential surface of the insertion hole 142, inclined with respect to the first direction A, and being in contact with the pressing portion 38a to be pressed by the pressing portion 38a when the pressing member 38 is inserted into the insertion hole 142.

The pressing portion 38a and the inclined portion 143 may be inclined in directions substantially corresponding to each other. However, an angle of inclination of the pressing portion 38a may be different from an angle of inclination of the inclined portion 143.

Before the pressing member 38 is inserted into the insertion hole 142, the body 141 may be pressed in the second direction B by the elastic member 149, and a coupled state of the coupler 140 and the first rod 120 may be maintained. Accordingly, a coupled state of the main body 110 and the first rod 120 may be maintained.

Accordingly, when the ejector 100 is positioned at the first location 100A or before the ejector 100 moves up to the second location 100B, the driver 110 and the first rod 120 may move together in the first direction A.

Thereafter, as shown in FIG. 11, when the ejector 100 is positioned at the second location 100B, the driver 110 may be in contact with the lower surface 37 of the core body 31, and accordingly, the pressing member 38 positioned on the lower surface 37 of the core body 31 may be inserted in the insertion hole 142.

When the pressing member 38 is inserted into the insertion hole 142, the pressing portion 38a of the pressing member 38 may press the inclined portion 143 of the insertion hole 142 obliquely along the inclined surface in the opposite direction of the second direction B to move the body 141 gradually in the opposite direction of the second direction B.

Thereafter, when the ejector 100 is positioned at the second location 100B, the pressing member 38 may be completely inserted into the insertion hole 142. A state in which the pressing member 38 is inserted in the insertion hole 142 may be maintained, and accordingly, the pressing member 38 may continue to press the body 141 in the opposite direction of the second direction B.

The pressing member 38 may include a pressing maintaining portion 38b formed at a height corresponding to the insertion hole 142 in the first direction A when the ejector 100 is positioned at the second location 100B.

The pressing maintaining portion 38b may maintain a state in which the body 141 inserted in the insertion hole 142 is pressed in the opposite direction of the second direction B. The body 141 may be positioned at a second location 141B at which the second coupling portion 144 departs from the insertion groove 124 and maintained in a state in which the body 141 is positioned at the second location 141B, by the pressing maintaining portion 38B.

Accordingly, the coupler 140 may be positioned at the second location 140B at which the coupler 140 is separated from the first rod 120, and the first rod 120 may be separated from the driver 110.

Accordingly, as shown in FIG. 12, because the first rod 120 is pressed in the first direction A by the pressing rod R in a state in which the first rod 120 is separated from the driver 110, the first rod 120 may further move in the first direction A than the driver 110, and accordingly, a driving unit 100 may be positioned at the third location 100C.

So far, although the technical concept of the disclosure has been described based on specific embodiments, the scope of rights of the disclosure is not limited to these embodiments.

It should be interpreted that various embodiments modified or changed by a person skilled in the art within a scope not deviating from the gist of the disclosure as the technical concept of the disclosure, which is defined in the claims, also belong to the scope of rights of the disclosure.

What is claimed is:

1. A mold comprising:
    a core in which a molded product is formed, the core comprising:
        a core body; and
        a sliding core on the core body, and separable from the core body in a first direction with respect to the core body; and
    an ejector to press the sliding core in the first direction to separate the molded product formed in the core from the core,
    wherein the ejector comprises:
        a driver positioned below the core and movable up to a lower surface of the core body in the first direction;
        a first rod movable in the first direction to press the sliding core to be separated from the driver; and
        a coupler configured to couple the first rod with the driver or separate the first rod from the driver, and
    wherein:
        the first rod is configured to be directly pressed by a pressing rod;
        the driver is configured to move in the first direction in response to the pressing rod pressing the first rod in a state in which the first rod is coupled with the driver; and
        the driver comprises a hole through which the pressing rod is configured to pass to press the first rod in a state in which the first rod is separated from the driver, so that the first rod is movable further in the first direction than the driver while the driver is flush with the lower surface of the core body.

2. The mold of claim 1, further comprising a template to support the core,
    wherein the template comprises an open space of which at least one area opens such that the driver is positioned inside the template, and
    the driver is movable up to the lower surface of the core body in the first direction inside the open space.

3. The mold of claim 2, further comprising a molding plate positioned between the core and the template to support the core,
    wherein the molding plate comprises a moving hole through which the ejector is movable in the first direction.

4. The mold of claim 3, wherein a front end of the moving hole is facing the lower surface of the core body in the first direction, and a rear end of the moving hole is facing the open space in the first direction.

5. The mold of claim 1, wherein the sliding core comprises a first sliding core formed in an upper side in first direction of the core body and positioned in a first portion of the core body, and a second sliding core formed in a lower side in first direction of the core body and positioned in a second portion of the core body,
    the rod comprises a first rod to be coupled with or to be separated from the driver and the first rod is movable to press the first sliding core in the first direction, and a second rod coupled with the driver and is movable to press the second sliding core in the first direction,
    the first rod moves further in the first direction than the driver, and
    the second rod moves in the first direction in which the driver moves.

6. The mold of claim 1, wherein the coupler is to be coupled with the first rod in a second direction that is orthogonal to the first direction, and to be separated from the first rod in an opposite direction of the second direction.

7. The mold of claim 6, wherein the coupler comprises one side to be coupled with the driver and an other side to be coupled with or released from the first rod.

8. The mold of claim 7, wherein the ejector further comprises an elastic member to connect the driver to one side of the coupler and to elastically support one side of the coupler.

9. The mold of claim 6, wherein the coupler is movable between a first location at which the coupler is coupled with the first rod and a second location at which the coupler is separated from the first rod in the second direction, and
    the ejector further comprises a pressing member presses the coupler in the opposite direction of the second direction to move the coupler from the first location to the second location in response to the pressing member is inserted into the coupler.

10. The mold of claim 9, wherein the coupler comprises an insertion hole through which the pressing member is inserted in the opposite direction of the first direction, and the pressing member protrudes from the lower surface of the core body toward the opposite direction of the first direction.

11. The mold of claim 10, wherein the pressing member comprises a pressing portion to press the coupler in the opposite direction of the second direction in response to inserting the pressing member into the insertion hole, and the pressing member presses the coupler while being inserted into the insertion hole in response to the coupler moving in the first direction together with the driver.

12. The mold of claim 11, wherein the pressing portion is inclined with respect to the first direction, and the coupler further comprises an inclined portion positioned on an inner circumferential surface of the insertion hole, inclined with respect to the first direction, and in contact with the pressing portion to be pressed by the pressing portion in response to inserting the pressing member into the insertion hole.

13. The mold of claim 5, wherein a spacing is formed between the first sliding core and the first rod in the first direction.

14. The mold of claim 13, wherein the ejector presses the second sliding core to move the second sliding core by a first distance in the first direction in a first stage, the ejector presses the first sliding core and the second sliding core to further move the first sliding core and the second sliding core together by a second distance in the first direction in a second stage, and the ejector presses the first sliding core to further move the first sliding core by a third distance in the first direction in a third stage.

* * * * *